J. M. DEMERATH.
MACHINE FOR BLANCHING NUTS.
APPLICATION FILED JUNE 15, 1917.
1,364,083.
Patented Jan. 4, 1921.
4 SHEETS—SHEET 1.
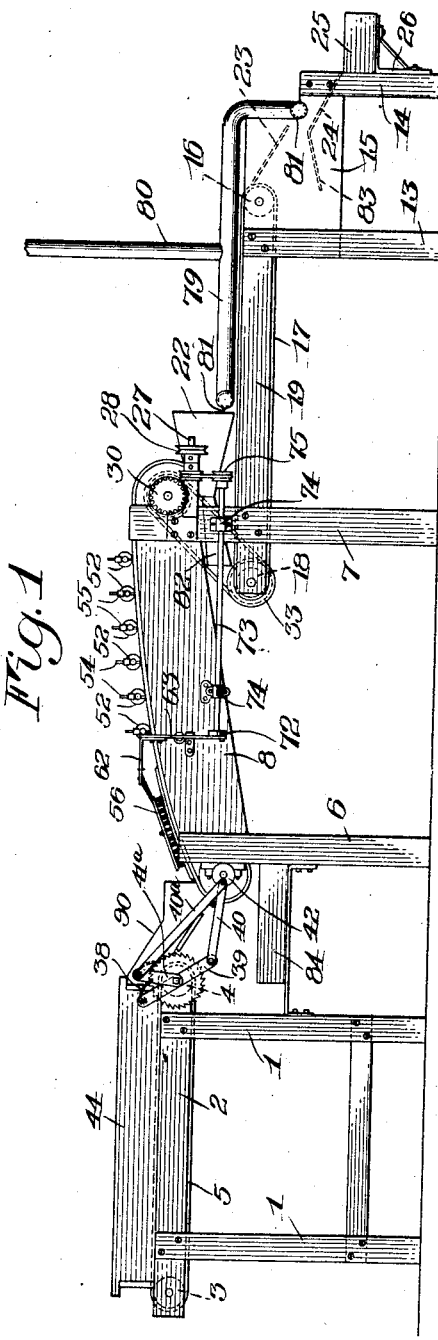
INVENTOR
Joseph M. Demerath
BY
his ATTORNEYS J. M. DEMERATH.
MACHINE FOR BLANCHING NUTS.
APPLICATION FILED JUNE 15, 1917.
1,364,083.
Patented Jan. 4, 1921.
4 SHEETS—SHEET 2.
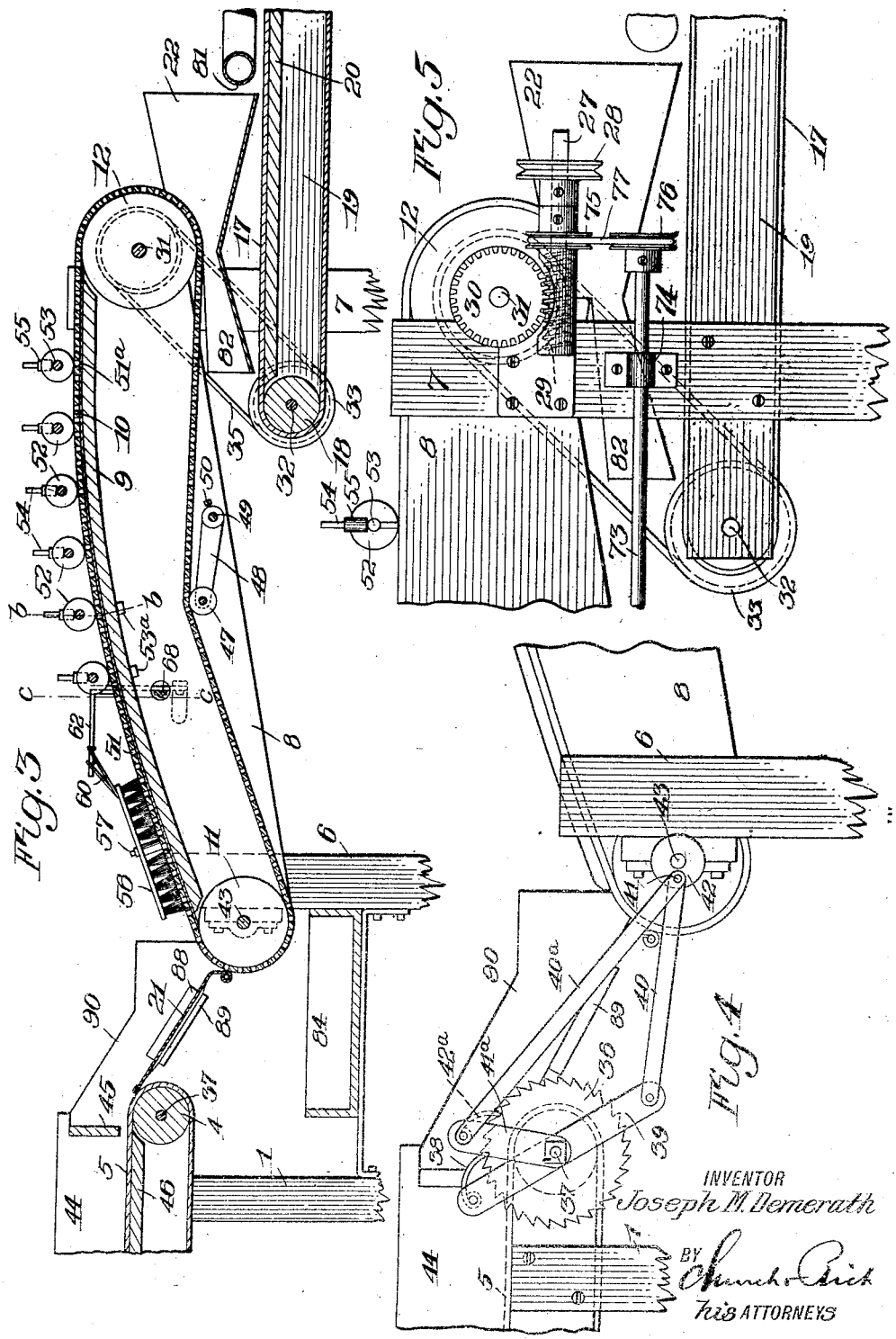
INVENTOR
Joseph M. Demerath
BY
His ATTORNEYS

J. M. DEMERATH.
MACHINE FOR BLANCHING NUTS.
APPLICATION FILED JUNE 15, 1917.

1,364,083.

Patented Jan. 4, 1921.
4 SHEETS—SHEET 3.

INVENTOR
Joseph M. Demerath

BY
his ATTORNEYS

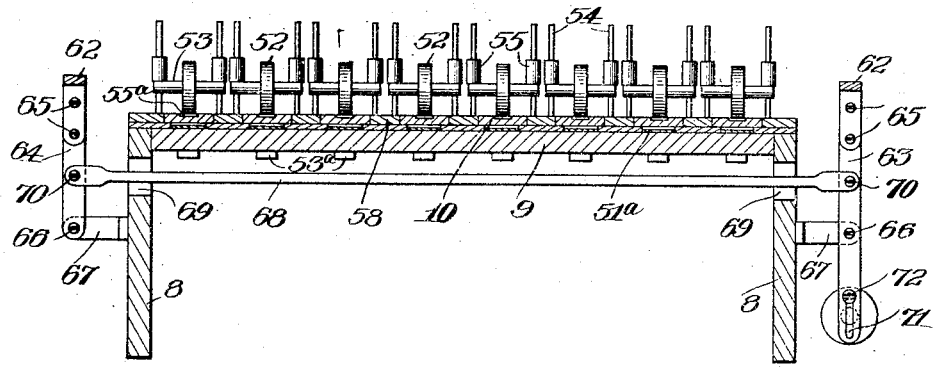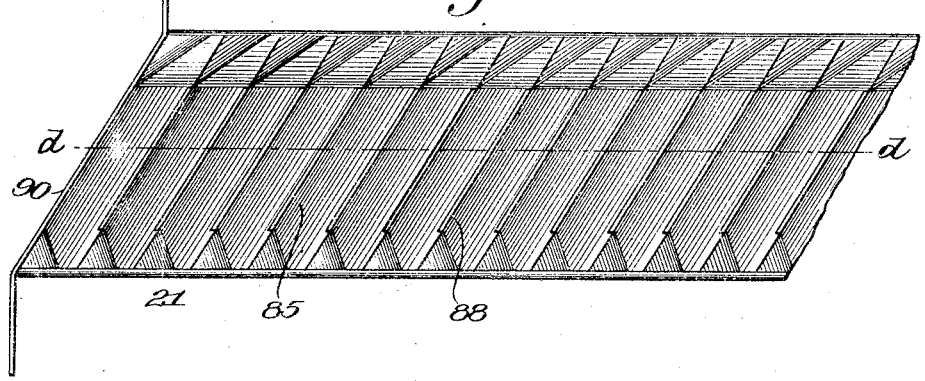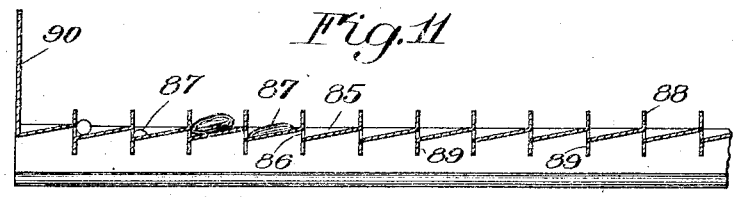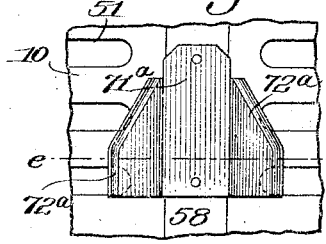

UNITED STATES PATENT OFFICE.

JOSEPH M. DEMERATH, OF ROCHESTER, NEW YORK, ASSIGNOR TO ROBLIN-DEMERATH CO., INC., OF ROCHESTER, NEW YORK, A CORPORATION OF NEW YORK.

MACHINE FOR BLANCHING NUTS.

1,364,083.

Specification of Letters Patent.  Patented Jan. 4, 1921.

Application filed June 15, 1917. Serial No. 175,026.

*To all whom it may concern:*

Be it known that I, JOSEPH M. DEMERATH, of Rochester, in the county of Monroe and State of New York, have invented certain new and useful Improvements in Machines for Blanching Nuts; and I do hereby declare the following to be a full, clear, and exact description of the same, reference being had to the accompanying drawings, forming a part of this specification, and to the reference characters marked thereon.

My invention relates to a machine for removing the skins from peanuts and similar products without splitting, or otherwise disfiguring the nuts, so that they may be retained in perfect condition, whereby their market value is greatly enhanced. A further object of the invention is to provide means for separating the skins from the nuts previous to the discharge of the latter from the machine. To these and other ends the invention consists in certain improvements and combinations of parts, all as will be hereinafter more fully described, the novel features being pointed out in the claims at the end of the specification.

In the drawings:

Figure 1 is a side elevation embodying one form of the invention;

Fig. 2 is a plan view thereof;

Fig. 3 is a longitudinal section taken on line $a$—$a$ of Fig. 2;

Fig. 4 is an enlarged detail side elevation of the feed mechanism;

Fig. 5 is a side elevation of the driving mechanism;

Fig. 9 is a transverse sectional view taken on line $c$—$c$ of Fig. 3;

Fig. 10 is an enlarged detail plan view of a portion of the chute shown at the left of Fig. 2;

Fig. 11 is a sectional view taken on line $d$—$d$ of Fig. 10;

Fig. 12 is a detail plan view of one of the guards for preventing the accumulation of an excess of nuts upon the belts, and Fig. 13 is a transverse sectional view taken on line $e$—$e$ of Fig. 12.

Similar reference characters throughout the several views indicate the same parts.

Figure 6:
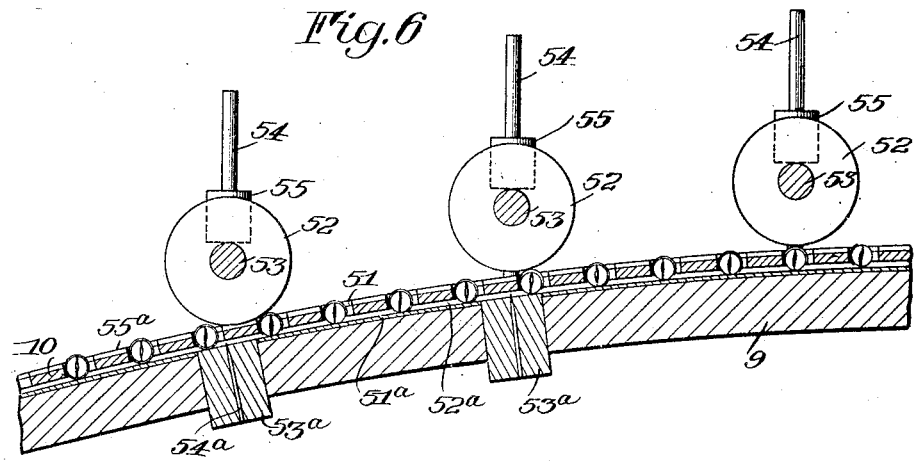
Fig. 6 is a longitudinal sectional elevation illustrating on an enlarged scale the means for effecting removal of the skins from the nuts.

The removal of skins from peanuts, an operation which is performed after the nuts are roasted, provides what is known in the trade as "blanched peanuts," and this operation is somewhat of a delicate one because of the fact that the nuts are easily separated or split. Nuts when broken apart sell for much less than those which are whole, and for this reason, the blanching of peanuts, so far as I am advised, is an operation that is performed by hand. The machine which I have devised while especially adapted for the purpose mentioned, is also capable of use in treating other objects and it will, therefore, be understood that I use the term "nuts" to cover all objects which it may be found desirable to treat with a machine of this kind.

The features of my invention, broadly considered, consist in providing two opposing surfaces between which the nuts or objects to be treated are passed, one of said surfaces being movable bodily toward and from the other, so as to accommodate articles of different diameters and apply an equal pressure to each. The supporting surface is preferably roughened or provided with an abrasive substance, while the other is of a softer character, such as rubber which will yield in addition to its bodily movement. In some instances the objects to be treated are operated upon by needle points or other suitable cutting instruments to effect a breaking of the skins or coverings. The nuts or objects are carried into contact with and moved between the operating surfaces by means of a conveyer provided with pockets which are open at the bottom, whereby the nuts when pushed along the supporting surface tend to roll in one direction until they come in contact with the yielding and bodily movable opposing surface which is adapted to exert upon the objects sufficient pressure to arrest the rolling movement above mentioned and as the article is carried along, to impart to it a tendency to rotate in the reverse direction, thus causing the surface covering which, in the case of the peanut, is called the "skin" to be loosened and separated from the body or kernel of the nut. The supporting surface being roughened insures the rolling of the nuts as well as the breaking of the skins thereof. In practice the bodily movable surface is preferably made of spongy rubber mounted in the form of a disk which is non-rotatable, whereby as the nut is carried beneath it, a dragging action or effect is produced, which is sufficient to break the somewhat brittle skin of a roasted peanut. Peanuts vary in diameter and contour and some of the skins are more easily removed than others. The action of the operating parts must be a delicate one to prevent splitting of the nuts, and, therefore, I preferably employ a plurality of these coöperating and bodily movable disks above the conveyer so that in the event the skin is not broken by the first member and not removed thereby the work will be completed by the remaining disks in conjunction with a stationary supporting surface.

The skins are separated from the nuts by means of a blower delivering a current of air in the path of the conveyer and over a carrier for discharging the nuts into a suitable receptacle.

In the construction shown in the present embodiment, 1 designates the upright frame members for supporting the side plates 2, upon and between which the rollers 3 and 4 are journaled carrying the feed belt 5. The frame members 6 and 7 are connected at their upper ends by the inclined side plates 8 which support the table 9 over which the conveyers 10 travel upon the rollers 11 and 12 at opposite ends of the table. At the front of the machine are the uprights 13 and 14 connected by the side plates 15 upon which a roller 16 is journaled carrying one end of the delivering belt 17, the other end of the belt engaging a roller 18 journaled upon the rear ends of the plates 19 connecting the uprights 7 and 13, the belt being arranged to travel over a table 20 spanning the distance between the plates 19.

The feed belt 5 delivers the nuts to a chute 21 from which they descend by gravity to the conveyers 10 by which they are carried to the chute 22 and thence to the delivering belt 17, from which they are discharged first to the incline 23 and then to the incline 24 and finally into the receptacle 25 supported by the brackets 26 on the uprights 14.

The driving mechanism for the feeding and delivering belts and conveyer comprises a shaft 27 carrying a pulley 28 which may be operatively connected with any suitable source of power. The shaft 27 is provided with a worm 29 operatively connected with a gear 30 on the shaft 31 upon which the rollers 12 are rigidly mounted. The shaft 32 carrying the roller 18 is provided with a pulley 33 connected with the pulley 34 on the shaft 31 by means of a belt 35, whereby operation of the delivering belt 17 is effected. The feeding belt 5 is operated step by step through the medium of the ratchet wheel 36 rigidly connected with the shaft 37 upon which the roller 4 is mounted, the ratchet being operated by the pawl 38 at the top of the lever 39 which is loosely connected with the shaft 37. The lower end of the lever carries one end of a connecting rod 40 operatively connected with the crank pin 41 on the disk 42 which is rigidly connected with the shaft 43 upon which the roller 11 is mounted. An additional connecting rod $40^a$ is operatively connected with the ratchet through the lever $41^a$ and pawl $42^a$, shown in Fig. 4. It will be understood, of course, that movement of the levers 39 and $41^a$ by the rods 40 and $40^a$ when moving in one direction will cause the pawls 38 and $42^a$ to ride over the teeth of the ratchet wheel without effecting its operation, while movement of the levers in a reverse direction will serve to effect rotation of the roller 4 to advance the belt 5 upon which the peanuts are carried within the container 44, whereby said belt will periodically deliver the desired quantity of the nuts to the chute 21, depending of course, upon the amount of space between the belt and end member 45 of the container 44. The upper portion of the belt 5 is supported in a horizontal position by the table 46 as shown in Fig. 3.

The conveyers or belts 10 may be properly tensioned by a roller 47 on an arm 48, the position of which may be varied upon the shaft 49, said arm being secured in the desired position by the set screw 50. When the peanuts reach the bottom of the chute 21 they are carried forward in the pockets 51 of the belts, the pockets all being preferably of a size sufficient to hold only one nut at a time.

The bodily movable disks or members 52 are mounted upon the cylindrical supports 53 which are movable up and down on the guides 54, preferably under the action of the weights 55, one or more of which is slidably mounted upon each of the guides. The disks when made of rubber or other yieldable material are forced up on the supports and will remain thereon in whatever position they may be placed, but they may be shifted from time to time as the edge engaging the nuts becomes excessively worn.

Figure 7:
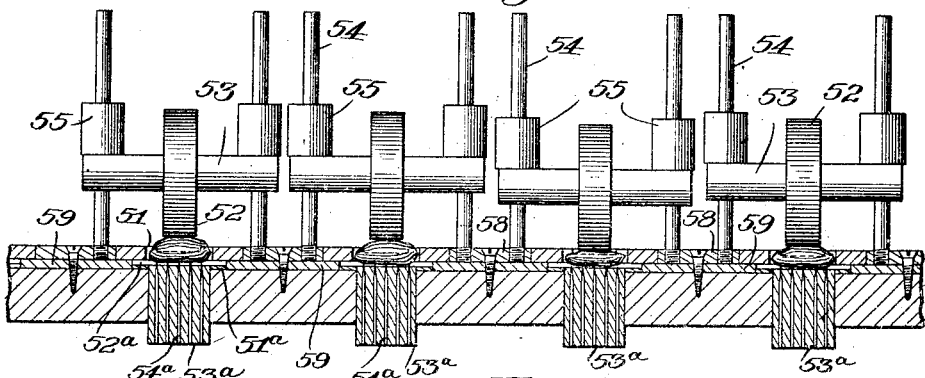
Fig. 7 is an enlarged transverse sectional view taken on line $b$—$b$ of Fig. 3.
Figure 8:
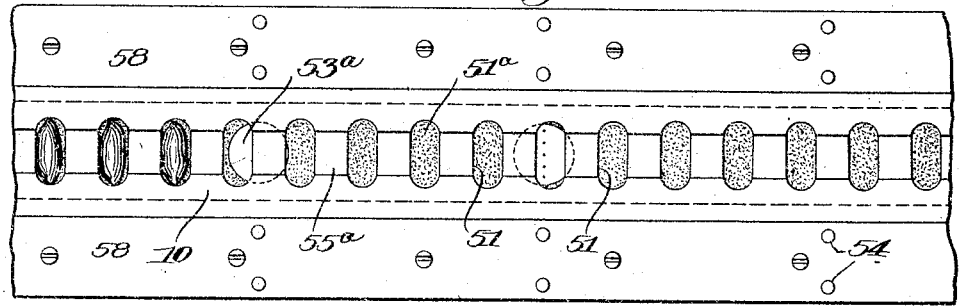
Fig. 8 is an enlarged detail plan view of one of the conveyers.

The center of the belt is preferably recessed as indicated at $55^a$ to allow the disks to operate upon relatively small nuts of the size shown in the third pocket to the right of Fig. 7.

In some instances, of course, at least two of the nuts may be carried forward by one of the pockets, due to the fact that one nut may push the other along if it is lodged on top of the belt against a nut contained in the pocket. This, of course, is objectionable for the reason that when the nuts pass under the friction disks the one on top will be engaged by the disk while the one in the pocket will not. In order to obviate this difficulty I have provided the oscillatory brushes 56 which are preferably pivoted at their centers upon the bolts 57 projecting upwardly from the belt guides 58 on the strips or cleats 59 secured to the top of the table 9, as shown in Fig. 3. The bottom of the brush is positioned high enough above the belt to clear the nuts in the pockets when moved back and forth above the face of the belt, but not high enough to clear the nuts that may lodge on top of the belt between the pockets, the result being that none of the nuts are allowed to be carried by the belt beneath the disks other than those lodged in the pockets. This operation is made surer by inclining the table upon which the belts travel so that when the nuts are swept off of the belts by the brushes they will roll back in the direction of the chute 21 to become lodged in the pockets and carried beneath the friction disks. Each of the brushes in the present instance is adapted to have its ends moved across the face of the two belts between which it is positioned, the arrangement being indicated in Fig. 2. To the inner ends of the two brushes at each side of the table are pivotally connected the rods 60 and 61 which are respectively pivoted upon the horizontal arms 62 secured to the upstanding levers 63 and 64 by the screws 65. The levers are pivoted at 66 upon the brackets 67 carried by the side rails 8 for supporting the table 9. A rod 68 extends through openings 69 in the side rails 8 and is pivotally connected at 70 with the levers 64 and 65 as shown in Fig. 9. The lever 63 is extended below the bracket 67 and provided with a slot 71 in which operates a crank pin 72 on the rear end of the lever operating shaft 73. The shaft 73 is rotatably mounted in the bearings 74 and is driven by the shaft 27 through the pulleys 75 and 76 and belt 77, as shown in Fig. 5. Additional means for preventing the belts from carrying forward a quantity of nuts not contained in the pockets 51 comprises the guards 71ª secured upon the belt guides 58 and having wing portions 72ª overlying the edges of the belts and spaced above the same a slight distance at an angle thereto, as shown in Fig. 13. These guards serve to prevent the advance of the nuts which become lodged upon the sides of the belts at the ends of the pockets and thus leave for the brushes the removal only of the excess nuts carried by the center of the belt between the pockets.

The stationary article supporting surfaces 51ª shown in Fig. 7 are preferably formed of sand paper or emery-cloth, but other suitable material may be substituted if desired. These strips are of a thickness less than the depth of the grooves in which they are placed, the grooves being formed by spacing the cleats 59 on the table 9, as shown. This construction allows the belt to travel on the cleats without touching the stationary strips and the space 52ª between the belt and strips will permit of the accumulation of a considerable quantity of the broken particles of skins without interfering with the operation of said belt.

At certain points beneath the belt and immediately under a number of the disks 52 I desire to insert through the table 9 the needle holding members 53ª which are preferably formed of cork or soft rubber, and through which are projected the needles or other sharp pointed instruments as indicated at 54ª, in Figs. 6 and 7. These needles extend into the path of the nuts and serve to cut the skins as the nuts are carried beneath the disks by the belt as shown in Fig. 7.

It is, of course, necessary to provide means for getting rid of the skins after they are broken up and separated from the nuts and to this end I have placed in front of the chute 22 and over the incline 23 the lateral extensions 78 of the tube 79 which is connected with the vertical tube 80, the latter being connected with a suitable blower (not shown).

The extensions 78 are provided with apertures 81 which are located in such a manner as to blow the skins through the rearwardly facing chute 82 and over the incline 83, as the nuts are passed from the conveyer to the receptacle 25 by means of the delivering belt 17.

The nuts to be treated as described herein will, of course, contain a certain per cent. of what is known as "splits" or half nuts, which detract from the market value of the product, and I have, therefore, constructed the chute 21 in such a manner that these half portions will fall through the chute into the receptacle 84 provided for that purpose. The chute comprises a plurality of troughs or guideways 85 extending from the feed belt 5 downwardly to the rear end of the table 9. The bottom surface of each of the guideways is tipped or inclined as shown in Fig. 11, and at the low side thereof are the elongated openings 86. As the nuts travel downwardly they will gravitate to the openings and the split portions therethrough as indicated by the half nut at 87. The passage of the half portions through the openings 86 is insured by reason of the fact that said openings, at the discharge end of the chute, terminate at points to one side of the points at which they originate at the top of the chute and consequently as the nuts roll down the guideways they are at all times traveling in the direction of the openings by reason of the fact that the bottoms of the guideways are inclined toward said openings. The whole nuts being too large to pass through said openings will, therefore, be discharged upon the conveyers or belts 10, and will find their way into the pockets 51.

The chute 21 is preferably constructed of suitably connected sheet metal strips, one edge of each of which is turned up as indicated at 88 and the other down as indicated at 89, the ends of the strips being flattened out and formed as shown in Figs. 3 and 10. Suitable plates 90 are provided at the sides of the chute for supporting the same as shown in Fig. 2, while the upper end of the chute is adapted to rest upon the feed belt 5, as shown in Fig. 3.

I claim as my invention:

1. In a machine for blanching nuts, the combination with a frictional supporting surface, means for conveying peanuts over said surface and tending to impart a rolling movement to the nuts to turn them over in one direction as they advance along the supporting surface, of an opposing surface disposed to frictionally engage the nuts during their travel to retard them by tending to turn them over in the other direction, such opposing forces serving to break and remove the skins of the nuts.

2. In a machine for blanching nuts, a pair of spaced rollers, a conveyer carried by the rollers provided with pockets, a feeding belt operatively connected with one of the rollers and arranged to deliver nuts to the conveyer, a receptacle, a delivering belt operatively connected with the other roller for delivering nuts from the conveyer to the receptacle, means for operating the last mentioned roller, a brush operatively connected with the last mentioned means, said brush being arranged to remove the excess nuts from the conveyer, means for frictionally engaging the nuts in the pockets to break their skins after they pass the brush, and means located between the conveyer and receptacle for separating the broken skins from the nuts.

3. In a machine of the class described, the combination of a table having a frictional surface, means for moving an object to be treated over said surface in contact therewith, and an opposing frictional surface for forcing the moving object yieldingly into contact with the surface of the table.

4. In a machine of the class described, the combination of a table having a hard frictional surface, means for moving an object to be treated over said surface in contact therewith, and a member having a soft yielding frictional surface adapted to force the moving object into contact with the surface of the table.

5. In a nut blanching machine, the combination of a receptacle for a supply of nuts, a conveyer having a plurality of pockets, means for feeding the nuts from the receptacle to the conveyer, and a plurality of means having frictional surfaces adapted to engage the nuts in the conveyer and loosen the skins therefrom.

6. In a nut blanching machine, the combination of a receptacle for a supply of nuts, a conveyer, means for conveying the nuts from the receptacle to the conveyer, opposing frictional surfaces for engaging the nuts in the conveyer for loosening the skins thereon, and means for simultaneously operating said conveyer and conveying means.

7. In a machine of the class described, the combination with a supporting surface, of a conveyer movable above the same having recesses therethrough each adapted to receive a nut, and a plurality of friction members above the conveyer arranged to be raised by the engagement of nuts therewith.

8. In a machine of the class described, the combination with a supporting surface, of a conveyer movable above the same having recesses therethrough each adapted to receive a nut, cutting instruments in the path of the conveyer on one side thereof for breaking the skins of the nuts, and means on the opposite side of the conveyer frictionally engaging the nuts when passing over said cutting instruments.

9. A machine of the class described comprising a conveyer having apertures therethrough, means for delivering nuts to the apertures and means adapted to frictionally engage the nuts upon opposite sides of the conveyer while being moved thereby.

10. A nut blanching machine, comprising a conveyer, means for frictionally engaging the nuts while being carried by the conveyer, and a plurality of guideways for delivering nuts to the conveyer each having an inclined supporting surface and an aperture at the low side thereof through which relatively small nut portions are adapted to be discharged.

11. A nut blanching machine comprising a conveyer, means for frictionally engaging the nuts while being carried by the conveyer, a plurality of guideways for delivering nuts to the conveyer, each having an inclined supporting surface and an aperture at the low side thereof through which relatively small nut portions are adapted to be discharged, and means for feeding the nuts to said guideways.

JOSEPH M. DEMERATH.